Patented Mar. 16, 1937

2,074,306

UNITED STATES PATENT OFFICE 2,074,306

PROCESS FOR THE PREPARATION OF ANTHRAQUINONE COMPOUNDS

Myron S. Whelen, Milwaukee, Wis., assignor to E. I. du Pont de Nemours & Company, Wilmington, Del., a corporation of Delaware No Drawing. Application June 24, 1936, Serial No. 87,117

4 Claims. (Cl. 260—57)

This invention relates to the preparation of anthraquinone compounds, more particularly to a new and improved process for the isolation of 6-halogen-1-anthraquinonesulfonic acids in substantially pure form directly from their sulfonation mass.

Due to the formation of isomeric alpha-monosulfonic acids in the sulfonation of beta-halogen-anthraquinones, it has been impossible to obtain pure 6-halogen-1-anthraquinonesulfonic acid by that route. Where the diluted sulfonation mass is salted with a potassium salt, not only the 6-chloro-1-anthraquinonesulfonic acid is precipitated but other impurities which cannot be separated therefrom by known methods.

It is, therefore, an object of this invention to provide a process for the preparation of relatively pure 6-halogen-1-anthraquinonesulfonic acid directly from beta-halogen-anthraquinone. It is a further object to provide a new and effective method for separating 6-halogen-1-anthraquinone directly from the sulfonation mass, substantially free from isomers and other contaminating impurities, by a simple, economical and commercially practical procedure.

I have now found that relatively pure 6-halogen-1-anthraquinonesulfonic acids may be obtained in the form of the sodium salt by direct sulfonation of beta-halogen-anthraquinone and by direct precipitation of the sodium salt from the diluted sulfonation mass. According to the present invention the sulfonation mass is diluted in water to an acid concentration of from 5 to 10% and an amount of sodium carbonate is added somewhat in excess of that necessary to form the sodium salt of the 6-halogen-anthraquinonesulfonic acids theoretically present in the solution.

The following examples are given to more fully illustrate the invention. The parts used are by weight.

Example 1

575 parts of 25% oleum, 100 parts of 65% oleum and 3 parts of mercuric sulfate are mixed together and heated to 60° C. To this solution are added, while stirring, 300 parts of beta-chloroanthraquinone. The temperature is then slowly raised to 125° C. and maintained at 125–130° C. until sulfonation of the beta-chloroanthraquinone is complete. The mass is then drowned in about 9000 parts of warm water containing 5 parts of sodium chlorate. It is then heated to 90–100° C. for one-half hour and filtered, if any solid material is present. To the filtrate 150 parts of soda ash are added and the suspension is allowed to stand for several hours after room temperature has been reached. The precipitated material is filtered off and sucked as dry as possible. If desired, very pure material may be obtained by reslurrying this product in about 3000 parts of warm water, followed by filtration at about 40° C. The material so obtained is practically pure 6-chloro-anthraquinone-1-sulfonic acid sodium salt.

The use of a potassium salt in place of the sodium salt in the above example, apparently because of the insolubility of the potassium salt of the 6-chloro-1-anthraquinonesulfonic acid in dilute acid as well as the insolubility of the potassium salt of the isomeric and disulfonic acid bodies present in the sulfonation mass, gives a very impure 6-chloro-1-anthraquinonesulfonic acid potassium salt. The purity of the products is determined by converting them to the 1,6-dichloroanthraquinone which has a definite melting point. The melting point of the 1,6-dichloroanthraquinone obtained from the procedure above outlined, prior to reslurrying in water, is 190–195° C., while the melting point of the dichloro compound obtained by the use of potassium salt varies from 162–173° C. Reslurrying of the sodium salt in water as described above gives a product which has a melting point of 195–200° C., while reslurrying of the potassium salt gives a product having a melting point of 173–178° C. The melting point found in the literature for pure 1,6-dichloroanthraquinone is 202° C.

Example 2

200 parts of 25% oleum, 35 parts of 65% oleum and 2 parts of mercuric sulfate are mixed together and heated under agitation to 60° C. 100 parts of beta-bromoanthraquinone are added and the mass is heated at 130° C. until sulfonation is complete. It is then drowned in water and treated in a manner analogous to that described in Example 1. The product obtained is substantially pure 6-bromo-1-anthraquinonesulfonic acid sodium salt.

To effect the desired separation of the 6-halogen-1-anthraquinone sulfonic acid the sulfonation mass is preferably diluted to an acid concentration of approximately 5%, figured on the amount of free sulfuric acid remaining in the solution, although it will be obvious that the exact concentration is not critical and may be raised or lowered to some extent. Too great a dilution decreases the yield of the desired product to some degree due to the slight solubility of the sodium salt, while higher acid concentrations are less desirable due to mechanical difficulties experienced in filtering, etc. Acid concentrations of from 4 to 10% have given satisfactory results.

The exact amount of sodium carbonate or other sodium salt to be added to the solution may be varied within reasonable limits. Sufficient should be added to form the sodium salt of all of the 6-chloroanthraquinonesulfonic acid present with some excess which operates to salt out the desired sulfonic acid. The final concentration of the salt solution figured as sodium sulfate may vary between from about 0.5 to 2% without unduly altering the purity or yield of the desired product. In using sodium chloride or sulfate equivalent amounts to that given for the sodium carbonate should be used.

I claim:

1. In the process for preparing 6-halogen-1-anthraquinonesulfonic acid by the direct sulfonation of beta-halogen-anthraquinone, the steps which comprise diluting the sulfonation mass in water and precipitating the 6-halogen-1-anthraquinonesulfonic acid as the sodium salt.

2. In the process for isolating 6-chloro-1-anthraquinonesulfonic acid from the sulfonation mass in which it is formed by direct sulfonation of beta-chloroanthraquinone, the steps which comprise diluting the sulfonation mass to a sulfuric acid concentration of from 4 to 10% and adding a sodium salt in sufficient quantity to form the sodium salt of all of the 6-chloroanthraquinonesulfonic acid present.

3. In the process for isolating 6-chloro-1-anthraquinonesulfonic acid from the sulfonation mass in which it is formed by direct sulfonation of beta-chloroanthraquinone, the steps which comprise diluting the sulfonation mass to a sulfuric acid concentration of from 4 to 10% and adding a sodium salt in sufficient quantity to form the sodium salt of all of the 6-chloroanthraquinonesulfonic acid present, adding sufficient excess to insure complete precipitation of all of the 6-chloro-1-anthraquinonesulfonic acid sodium salt, and filtering the product.

4. In the process for isolating 6-chloro-1-anthraquinone sulfonic acid from the sulfonation mass in which it is formed by direct sulfonation of beta-chloroanthraquinone, the steps which comprise diluting the sulfonation mass to a sulfuric acid concentration of from 4 to 10% and adding a sodium salt in sufficient quantity to form the sodium salt of all of the 6-chloroanthraquinonesulfonic acid present, adding sufficient excess to insure complete precipitation of all of the 6-chloro-1-anthraquinonesulfonic acid sodium salt, filtering the product, reslurrying the filter cake in water and filtering to effect a further purification.

MYRON S. WHELEN.